Dec. 16, 1930.  W. H. CAMPBELL  1,785,671
RIMMING PRESS
Filed Dec. 10, 1927  2 Sheets-Sheet 1
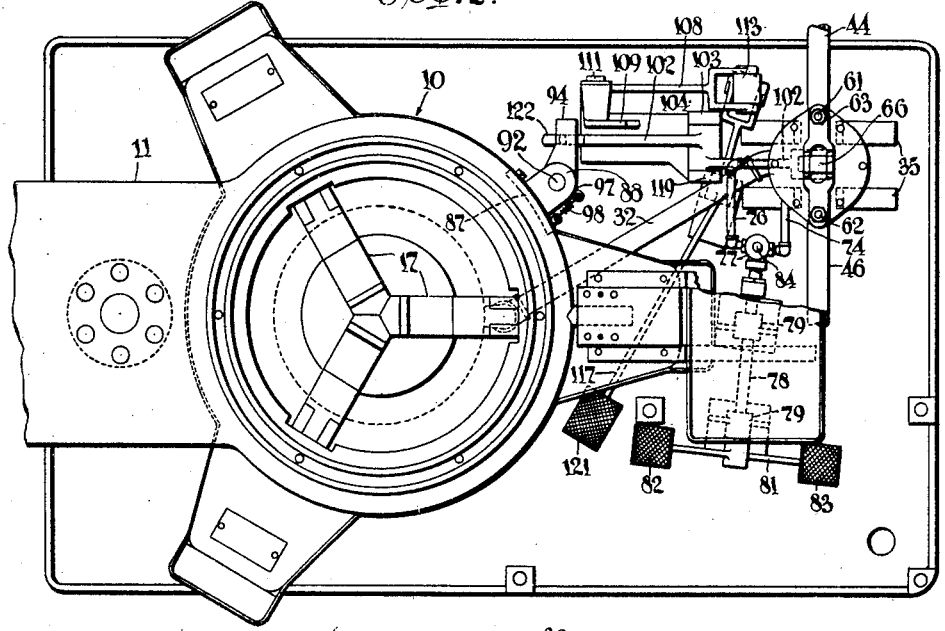
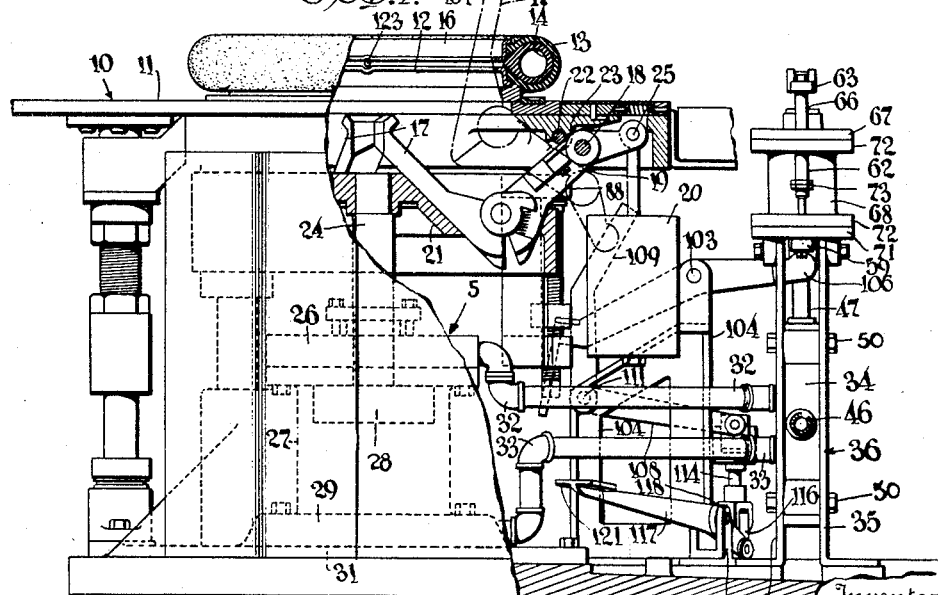
Inventor
Wallace H. Campbell,

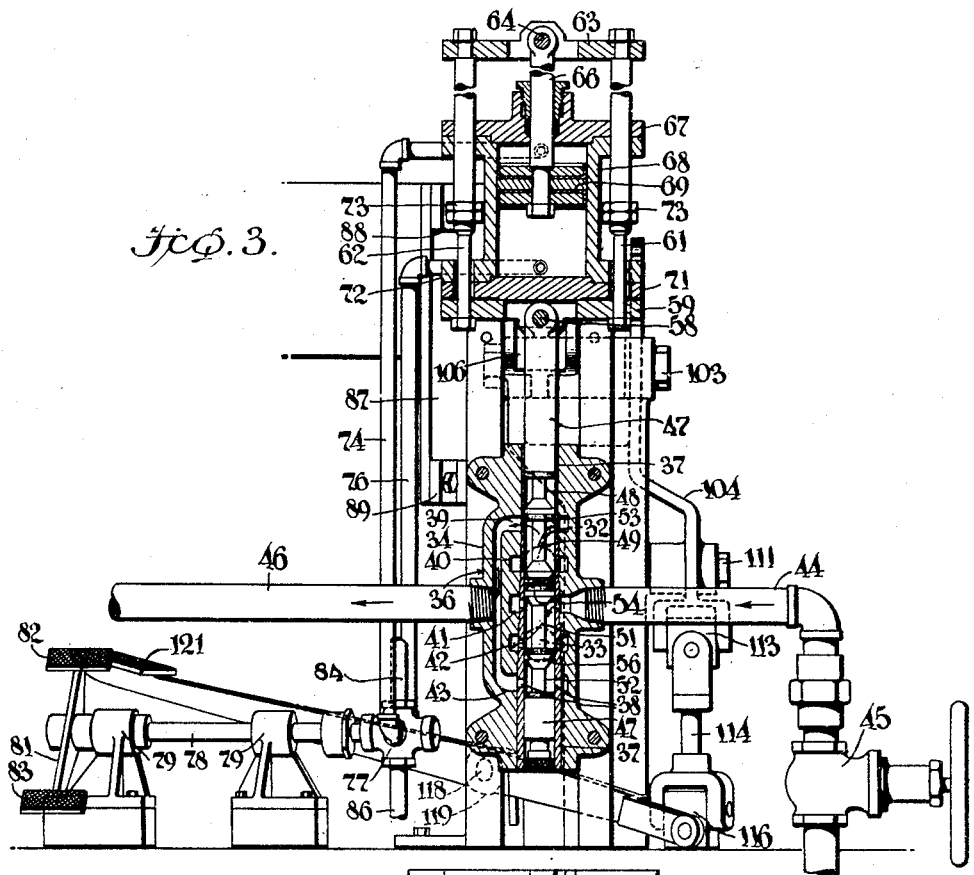
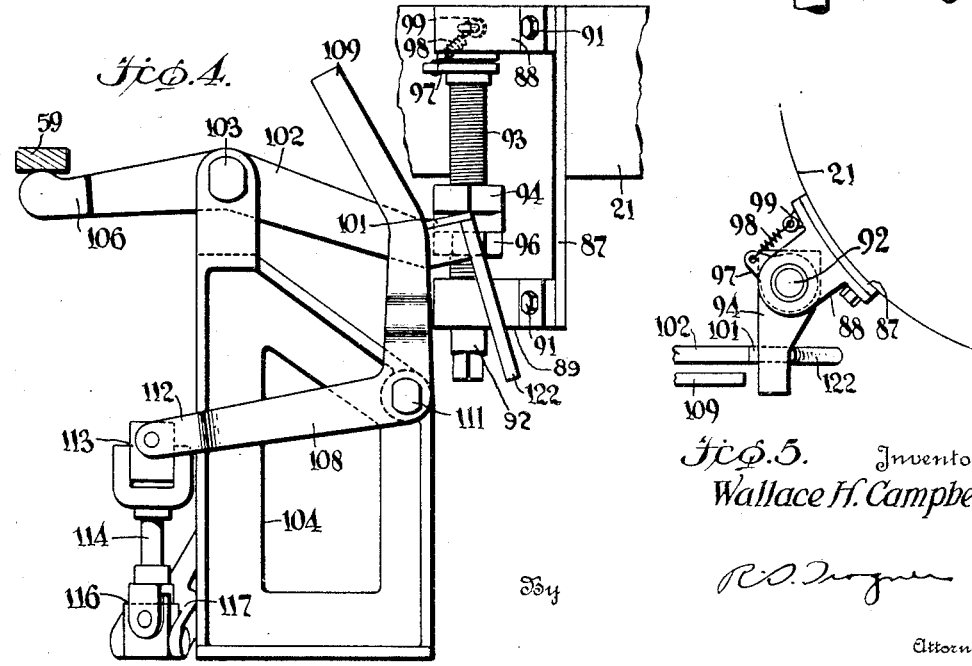

Patented Dec. 16, 1930

1,785,671

UNITED STATES PATENT OFFICE

WALLACE H. CAMPBELL, OF AKRON, OHIO, ASSIGNOR TO THE GOODYEAR TIRE & RUBBER COMPANY, OF AKRON, OHIO, A CORPORATION OF OHIO

RIMMING PRESS

Application filed December 10, 1927. Serial No. 239,176.

My invention relates to presses and has particular relation to apparatus of the above designated character which shall be especially applicable for clamping rims upon uncured pneumatic tire casings containing airbags prior to the vulcanization thereof.

One object of the invention is to provide an improved rimming press for uncured pneumatic tire casings so constructed as to reduce, substantially, the tendency of the airbag to wrinkle when it is inflated.

Another object of the invention is to provide a press wherein the pressing elements execute, successively, a plurality of operations intermediately of predetermined limits of movement.

Prior to this invention, rims were clamped upon the bead portions of an uncured pneumatic tire casings containing an airbag by one continuous movement of the pressing elements of a press. Then they were secured by bolts and the airbag was inflated to a predetermined pressure, after which the casing was molded or cured. Very often the airbag became wrinkled during its inflation because of its inability to expand properly within the closed casing. Such wrinkles often remained in the airbag during the entire curing period as a result of which imperfect casings were produced.

In this embodiment of the invention, the bead portions of a pneumatic tire casings are only partially closed by the rims during the initial movement of the pressing elements of the press. Thus, while the rims are partially separated and the casing is incompletely closed, the airbag is inflated. Thereafter, the rims are drawn completely together by an additional movement of the pressing elements and then fastened by bolts which extend through openings formed in the rims.

For a better understanding of the invention, references may now be had to the accompanying drawings, forming a part of the application, in which:

Fig. 1 is a side elevational view, partly in cross-section illustrating one embodiment of the invention;

Fig. 2 is a plan view of the press illustrated by Fig. 1;

Fig. 3 is a fragmentary view, partly in cross-section and partly in elevation, illustrating a valve mechanism for controlling the operation of the press;

Fig. 4 is a view illustrating a portion of an intermediate stop mechanism embodied in the press; and Fig. 5 is a fragmentary plan view showing in detail a portion of the intermediate stop mechanism.

In practicing the invention, a rimming press 10 is employed, the press being similar to those illustrated and described in detail in the co-pending applications of Robert W. Snyder, Serial No. 43,047, filed July 11, 1925, and Leslie E. Doughtery, Serial No. 23,721, filed April 16, 1925 now Patent No. 1,676,821, dated July 10, 1928. The present application, together with those above mentioned is the property of a common assignee.

The press 10 comprises a platform 11 for supporting a rim 12 upon which is positioned an uncured pneumatic tire casing 13 containing an uninflated airbag 14. A rim 16, similar to the rim 12, is superposed on the casing 13 above the first rim. Pressing elements 17, pivotally supported intermediate the ends thereof on pins 18 engage the rim 16 and move it in the direction of the rim 12, thus tending to close the casing 13 upon the airbag 14. Weights 20 supported by pins 25 secured in the ends of the elements 17 tend to maintain the opposite ends thereof in an elevated position. The pins 18 are rigidly secured in the ends of arms 19 which extend radially from a circular support 21.

Cylindrical metal elements 22 serving as stops secured in opening formed in lugs 23 extending from the lower surface of the platform 11 are adapted to engage the pressing elements 17 adjacent the pins 18 and cause the ends thereof to pivot downwardly when the support 21 is elevated.

A vertically disposed piston rod 24, upon the upper end of which the support 21 is mounted, extends into a fluid motor 5 through a head 26 of a cylinder 27 and is secured to a piston 28 which slidably engages the inner surface of the cylinder 27. A head 29 for closing the opposite end of the cylinder 27 is formed integrally with respect to a base plate 31 which supports the rimming press 10. Fluid conduits 32 and 33 connect the opposite ends of the cylinder 27 to a casing 34 of a valve 36 which controls the fluid under pressure for actuating the press. A pair of spaced vertically disposed bars 35, secured to the casing 34 by bolts 50 extending therethrough, support the valve 36. When the fluid is admitted through the conduit 32, the support 21 is moved downwardly by the piston 28, thus lowering the pins 18 with respect to the stops 22 and permitting the elevation of the ends of the elements 17 by the weights 20 as shown by dot and dash lines in Fig. 1, designated by the numeral 30. As the piston 28 and the support 21 descend, the elements 17 engage the rim 16 and press it downwardly toward the rim 12. When fluid is admitted to the cylinder 27 through the conduit 33, the piston 28 and the support 21 move in the opposite direction, thus elevating the upper ends of the pressing elements 17 with respect to the rim 16 until the stops 22 engage the elements and they are forced downwardly against the support 21.

A sleeve 37 (Fig. 3) mounted in the interior of the casing 34 is provided with a plurality of radially disposed openings 38 which provide communication between the interior of the sleeve and a plurality of spaced annular ports 39, 40, 41, 42, and 43 formed in the casing immediately adjacent the sleeve. The port 41 communicates with a fluid supply conduit 44, threaded into the casing, which is controlled by a globe valve 45. Ports 39 and 43 communicate with an exhaust conduit 46 also threadably engaging the casing 34. Ports 40 and 42 are positioned directly opposite the conduits 32 and 33 respectively and communicate therewith. One end of a rod 47 slidably mounted in the sleeve 37 is provided with a plurality of reduced portions 48, 49, 51 and 52 which are separated by rings 53, 54 and 56 formed therebetween. When the rod 47 is in an intermediate position, the ring 54 closes the openings 38 communicating with the port 41 while the rings 53 and 56 respectively are positioned immediately adjacent the ports 39 and 43 between the latter and the ports 40 and 42. When the rod 47 is moved upwardly within the sleeve 37, the annular space surrounding the reduced portion 51 provides communication between the supply conduit 44 and the conduit 33 through the ports 41 and 42 and the openings 38 in the casing. Simultaneously therewith the annular space surrounding the reduced portion 49 provides communication between the conduit 32 and the exhaust conduit 46 through the radial openings 38 in the sleeve 37 and the annular ports 40 and 39. When the rod 47 is moved in the opposite direction a corresponding distance beyond the aforesaid intermediate position, the supply conduit 44 communicates with the conduit 32 and the conduit 33 communicates with the exhaust conduit 46, as described above.

The upper end of the rod 47 is connected by a pin 58 to an intermediate portion of a bar 59 rigidly secured at opposite ends to the lower ends of spaced vertically disposed rods 61 and 62. A bar 63, connecting the upper ends of the rods 61 and 62, is provided with a pin 64, rigidly secured in an intermediate portion thereof, which pivotally supports the upper end of a piston rod 66, extending through a head 67 of a cylinder 68 and provided at its lower end with a piston 69, slidably engaging the cylinder 68. The cylinder 68 is rigidly mounted on the ends of the bars 35 extending above the valve casing 34. The opposite end of the cylinder 68 is provided with a head 71 positioned between the end of the cylinder and the bar 59. The rods 61 and 62 are slidably mounted in aligned openings formed in flanges 72 of the cylinder 68, and in the heads 67 and 71. When the piston 69 in the cylinder 68 is in an elevated position, the bar 59 engages the head 71 thus limiting the upward movement of the rod 47. When the piston 69 is moved in the opposite direction, lock nuts 73 on the rods 61 and 62 engage the lower flanges 72 of the cylinder 68.

Conduits 74 and 76 respectively connect the upper and lower ends of the cylinder 68 to a rotary valve 77 provided with a controlling shaft 78 journaled in bearings 79. A bar 81 rigidly mounted intermediate its ends on the end of the shaft 78 is provided with treadles 82 and 83 secured thereto at opposite ends thereof. A compressed air supply conduit 84 and an exhaust conduit 86 also are connected to the rotary valve 77 on opposite sides thereof between the conduits 74 and 76. The rotary valve 77 is so constructed as to provide communication between the conduits 74 and 84 and between the conduits 76 and 86 when the treadle 82 is depressed. Conversely, when the treadle 83 is depressed, the valve 77 provides communication between the conduits 76 and 84 and between the conduits 74 and 86. Thus, when fluid under pressure is admitted from the conduit 74 into the upper end of the cylinder 68 above the piston 69, the rod 47 is moved downwardly thus initiating the operation of the press for closing the rims 16 and 12 on the pneumatic tire casing 13, as hereinbefore described.

As best shown by Figs. 4 and 5, a plate 87, secured on one side of the support 21 and extending downwardly therefrom, is provided at opposite ends with bearings 88 and 89 bolted thereto, as indicated at 91. A rod 92, having an intermediate threaded portion 93, is journaled adjacent its opposite ends in the bearings 88 and 89. A latch 94 operatively engaging the threaded portion 93 of the rod 92 is adapted to be secured, by a lock nut 96, in any desired position longitudinally thereof. The end of an arm 97, rigidly secured on the upper end of the rod 92, is engaged by one end of a spring 98 connected at its opposite end to a lug 99 formed on the bearing 88. The spring 98 tends to rotate the latch 94 into a position immediately above one end 101 of a lever 102, pivotally mounted intermediate its ends on a pin 103 that is secured in an upper portion of a frame 104. An opposite bifurcated end 106 of the lever 102 is adapted to engage the lower side of the bar 59 on opposite sides of the rod 47. When the support 21 moves downwardly, the latch 94 engages the end 101 of the lever 102 and causes the latter to pivot on the pin 103 thus raising the bifurcated end 106 and the rod 47. As the rod 47 moves upwardly under the influence of the lever 102, the ring 54 closes the communication between the port 41 connected to the supply conduit 44 and the conduits 32 and 33 while the rings 53 and 56 also prevent communication between the aforesaid conduits and the exhaust conduit 46.

Since the fluid in the cylinder 27, thus is isolated from either the supply conduit 44 or the exhaust conduit 46, further movement of the support 21 positively is prevented. Consequently, the movement of the elements 17 is discontinued in an intermediate position and the rims 12 and 16 are temporarily maintained in spaced relation to each other as shown by Fig. 1.

A lever 108, having an obliquely disposed upper end portion 109 extending upwardly adjacent the end 101 of the lever 102 is pivotally mounted on a pin 111 secured in the frame 104. The opposite end 112 of the lever 108 is connected, by a universal joint 113, to a rod 114, which in turn is connected by a universal joint 116 to one end of a lever 117 pivoted intermediate its ends on a pin 118 secured in a bracket 119. A treadle 121 is rigidly secured on the end of the lever 117 opposite that connected to the rod 114.

When the treadle 121 is depressed, the levers 117 and 108 are rotated on the pins 118 and 111 respectively thus moving the end 109 of the lever 108 toward the latch 94. The rod 92 and the latch 94 consequently are rotated against the tension of the spring 98, thus releasing the latch 94 from the end 101 of the lever 102. Consequently, the rod 47 is permitted to move downwardly, under the influence of the air in the cylinder 68 above the piston 69 and the cylinder 27 again is connected, above the piston 28 to the supply conduit 44, the opposite side of the piston simultaneously being connected to the exhaust conduit 46. Thereafter, the support 21 is permitted to continue its downward movement and the rim 16 is brought into engagement with the rim 12.

When the latch 94 is moved beyond the end 101 of the lever 102, it engages a bar 122 rigidly secured normally to the end thereof which prevents the latch from being caught under the end of the lever 102 during the upward movement of the support 21 when the elements 17 assume their normal position against the support.

In the operation of the press, assuming the rims 16 and 12 to be in position for engagement with the casing 13 on the platform 11, the treadle 82 is depressed thus initiating the operation of the press for partially closing the rims, as hereinbefore described. A hose (not shown) supplying compressed air is attached to a valve stem 123 of the airbag 14, thereby inflating the latter. Thereafter, the treadle 121 is depressed and the pressing elements 17 completely close the rims 12 and 16 upon the casing 13. When the bolts, (not shown) for maintaining the rims in closed position, have been applied, the treadle 83 is depressed and the pressing elements 17 are withdrawn from the rims and the press as the press assumes its normal position.

From the foregoing description, it is apparent that the invention is simple in construction and readily adaptable to standard presses. A press embodying the aforesaid invention represents an extremely profitable investment as a production machine owing to the relatively great reduction in the number of imperfect casings resulting from airbag wrinkles as compared with the imperfect casing resulting from the operation of presses known heretofore.

Although only the preferred form of the invention has been illustrated and described in detail, it will be apparent to those skilled in the art that it is not so limited but that various modifications may be made therein without departing from the spirit of the invention or from the scope of the appended claims.

What I claim is:

1. A rimming press comprising a table for supporting a pair of rims in engagement with a pneumatic tire casing, fluid actuated means for pressing the rims together and means actuated by the movable portion of the press for rendering the fluid pressure ineffective for pressing the rims intermediate the limits of movement of the first means.

2. A rimming press comprising a table for supporting a pair of rims in engagement with a tire casing, means for pressing the rims together, a fluid motor for actuating the means, a valve for controlling the motor and means for actuating the valve intermediate the limits of movement of the pressing means.

3. A rimming press comprising a table for supporting a pair of rims in engagement with a tire casing, means for pressing the rims together, a pneumatic device for initiating the operation of the means, and a member actuated by engagement with the means for opposing the operation of the pneumatic device.

4. The combination with a fluid actuated rimming press of a valve for controlling the flow of fluid to the press, means for operating the valve for initiating the operation of the press, means engaged by the press during its rim closing movement for discontinuing the flow of fluid to the press, and means for continuing the flow of fluid to the press for completing the rim closing movement.

5. The combination with a rimming press, of a latch mounted for movement with the press, means engaged by the latch for discontinuing the operation of the press, and means for changing the relative position of the latch and the means.

6. The combination with a rimming press, of a latch mounted for movement therewith, means engaged by the latch for discontinuing the operation of the press and means for rendering the means inoperative.

7. The combination with a rimming press, of a latch mounted for movement therewith, means engaged by the latch for discontinuing the operation of the press, means for rendering the first mentioned means inoperative, and a resilient element associated with the latch tending to oppose the operation of the second mentioned means.

8. The combination with a rimming press having an actuated fluid control valve operated by a pneumatic device, of means for admitting fluid to the pneumatic device for moving the valve in position to admit fluid for actuating the press and means engaged by a moving portion of the press for actuating the pneumatic device against the pressure of the fluid therein.

In witness whereof, I have hereunto signed my name.

Signed at Akron, in the county of Summit, and State of Ohio, this 9th day of December, 1927.

WALLACE H. CAMPBELL.